(12) United States Patent
Wilner et al.

(10) Patent No.: US 6,341,021 B1
(45) Date of Patent: Jan. 22, 2002

(54) DYNAMIC POWER EQUALIZATION OF MANY WAVELENGTH-DIVISION-MULTIPLEXED CHANNELS IN A FIBER-OPTIC SYSTEM

(75) Inventors: Alan E. Wilner, Los Angeles, CA (US); David A. Smith, Shaker Heights, OH (US); Jin-Xin Cai, Los Angeles, CA (US); Kai-Ming Feng, Alhambra, CA (US); Xingyu Zou, San Jose, CA (US); Shouhua Huang, Huntington Beach, CA (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/023,741

(22) Filed: Feb. 13, 1998

Related U.S. Application Data

(60) Provisional application No. 60/037,757, filed on Feb. 13, 1997.

(51) Int. Cl.[7] ................................................. H04J 14/02
(52) U.S. Cl. ........................................ 359/124; 359/127
(58) Field of Search ............................ 359/110, 124, 359/127, 177, 337, 349, 134; 385/24

(56) References Cited

U.S. PATENT DOCUMENTS

| | | | | |
|---|---|---|---|---|
| 5,276,543 A | * | 1/1994 | Olshansky | 359/124 |
| 5,828,451 A | * | 10/1998 | Bellus et al. | 356/326 |
| 5,915,052 A | * | 6/1999 | Ball | 385/24 |
| 5,986,800 A | * | 11/1999 | Kosaka | 359/341 |
| 6,055,092 A | * | 4/2000 | Sugaya et al. | 359/337 |
| 6,134,034 A | * | 10/2000 | Terahara | 359/124 |
| 6,137,604 A | * | 10/2000 | Bergano | 359/124 |

OTHER PUBLICATIONS

Huang et al., "Experimental Demonstration of Dynamic Network Equalization of Three 2–5–Gb/s WDM Channels over 1000 km Using Acoutooptic Tunable Filters", IEEE, vol. 8, No. 9, pp. 1243–1245, Sep. 1996.*

* cited by examiner

Primary Examiner—Leslie Pascal
Assistant Examiner—Dalzid Singh
(74) Attorney, Agent, or Firm—Fay, Sharpe, Fagan, Minnich & McKee, LLP

(57) ABSTRACT

A dynamic power equalization module (10) for an optical network is provided. It includes a module input (16) for receiving an optical transmission (14) containing a combination of different channels ($C_1$–$C_n$). Each channel ($C_1$–$C_n$) has a different characteristic wavelength ($\lambda_1$–$\lambda_n$) and different varying power. A power equalization device that is polarization insensitive is connected between the module input (16) and a module output (20). The power equalization device is driven by RF acoustic signals (26). A feedback loop (22) receives at least a portion of output from the module output (20) and generates, based upon a comparison of relative powers of the different channels ($C_1$–$C_n$), the RF acoustic signals (26) which drive the power equalization device. The power equalization device is driven such that it dynamically controls transmission of the different channels ($C_1$–$C_n$) to substantially equalize power differentials therebetween. The power equalization device includes a parallel array of acousto-optic modulators ($AO_1$–$AO_n$).

20 Claims, 11 Drawing Sheets

DYNAMIC POWER EQUALIZATION OF MANY WAVELENGTH-DIVISION-MULTIPLEXED CHANNELS IN A FIBER-OPTIC SYSTEM

This application claims the benefit of U.S. Provisional Application No. 60/037,757, filed Feb. 13, 1997.

This invention was made with government support under Grant No. F30602-94-1-0001 awarded by the Army. The government has certain rights in this invention.

BACKGROUND OF THE INVENTION

The present invention relates to the art of multi-channel power equalization in wavelength-division-multiplexed (WDM) optical networks. It finds particular application in conjunction with data transmission for local and wide area optical networks and will be described with particular reference thereto. It is to be appreciate, however, that the invention is also amenable to other applications wherein high-speed data transfer among multiple users and/or long-distance data transmissions are desirable.

In the implementation and development of local and wide area optical networks, data transmission systems, routing networks, and the like, it is desirable to provide high-capacity, high-speed, and/or long-distance data transmissions among multiple users. Two valuable technologies useful for achieving the aforementioned goals include wavelength-division-multiplexers (WDM) and erbium-doped fiber amplifiers (EDFA). In conventional WDM systems, many different wavelength channels are simultaneously transmitted along the optical fibers or data transmission lines. A typical system will carry 4–16 different wavelength data channels with wavelength spacings varying between 0.8 and 4.0 nm. This approach dramatically increases the capacity of the transmission system and permits wavelength dependent optical network routing. EDFA's offer several advantages including high gain, low-additive noise, and fiber compatibility. Most relevant for WDM applications is the EDFA's ability to amplify multiple wavelengths over a wide band width, typically 1 MHz. Additionally, for robust networks and/or systems, it is advantageous that power differentials between the various WDM channels remain small so as to minimize interchannel cross talk and ensure adequate gain for all the channels. Moreover, stability to dynamic changes in the system parameters is paramount to the successful implementation of a high-speed WDM optical network.

Traditionally, two obstacles in implementing WDM networks are: (1) the non-uniformity of EDFA gain, and (2) dynamic changes in channel powers. Since the EDFA gain is not uniform with wavelength, the lower gain channels progressively lose power relative to the higher gain channels. Amplifier chains impart a significant power and signal-to-noise ratio (SNR) differential among the various channels, significantly limiting the transmission distance and usable amplifier band width. Conventionally, the usable band width can be as small as approximately 5 nm after an EDFA cascade. In addition, as channel powers vary in a dynamic network, several system complications may arise which can potentially cause network failure. Variables which are troublesome include: changes in the input signal powers; drift in component wavelength selectivity; changes in link losses; and, changes in amplifier gain. Variable insertion losses, neighboring channel addition and deletion, unstable laser power, non-uniform EDFA gain, and microsecond long gain transients in EDFA cascades are other system parameters whose change can have deleterious effects on signal power.

In the past, passive channel power equalization methods such as long-period fiber grading, end-to-end telemetry, and the like have been employed to at least partially address the above-mentioned concerns. However, while passive gain equalization schemes can provide performance improvement for a point-to-point static or slow-changing link, they are not satisfactory for a dynamically reconfigurable network or for a static network with potential parameter changes. This is because the individual channel powers may vary significantly due to the dynamic and distributed characteristics of the WDM network and the EDFA gain non-uniformity varies with dynamic input load. Even an end-to-end telemetry technique, in which the output determines a wavelength selective attenuation of the input, is not adequate for systems that may change faster than tens of milliseconds. In another previous undertaking employed to address the above-mentioned concerns, erbium-doped fluoride fibers having a smaller gain non-uniformity were utilized. However, such a system cannot accommodate the dynamic changes in the network.

The present invention contemplates a new and improved dynamic network equalization module that overcomes the above-referenced problems and others. Moreover, it equalizes WDM channel powers to ensure robust network operation, a high gain, and a high SNR for all channels.

SUMMARY OF THE INVENTION

In accordance with one aspect of the present invention, a dynamic power equalization module for an optical network is provided. It includes a wavelength-division-multiplexer having an optical input for receiving an optical data transmission containing a plurality of different channels each with correspondingly different wavelengths. The wavelength-division-multiplexer spectrally separates the optical data transmission received by the optical input into parallel optical outputs which correspond to the different channels. A parallel array of acousto-optic modulators driven by RF acoustic signals is connected to the optical outputs of the wavelength-division-multiplexer. A coupler passively combines optical outputs from the parallel array of acousto-optic modulators such that the combined optical outputs from the parallel array of acousto-optic modulators is relayed to a plurality of coupler outputs corresponding to a feedback loop for the different channels and at least one coupler output corresponding to the dynamic power equalization module output. A plurality of optical filters are connected to the coupler outputs corresponding to the feedback loop. Each optical filter filters-out wavelengths that do not correspond to the channel in which they are being transmitted. A plurality photodetectors each receive an output from corresponding optical filters such that the plurality of photodetectors produce signals representative of powers of the different channels. A dynamic control circuit compares the signals produced by the plurality of photodetectors to determine the relative power of the different channels and generates the RF acoustic signals that drive the parallel array of acousto-optic modulators. The parallel array of acousto-optic modulators are driven such that each acousto-optic modulator dynamically controls each channels' transmission and reduces its power level to be substantially the same as that of a reference channel.

In accordance with another aspect of the present invention, a dynamic power equalization module for an optical network includes a module input for receiving an optical transmission containing a combination of different channels. Each channel has a different characteristic wavelength and different varying powers. A power equalization device that is polarization insensitive is connected between the module input and a module output. The power equalization device is driven by RF acoustic control signals. A feedback loop which receives at least a portion of output from the module output and generates, based upon a comparison of relative powers of the different channels, the RF acoustic control signals which drive the power equalization device. The power equalization device is driven such that it dynamically controls transmission of the different channels to substantially equalize power differentials therebetween.

In accordance with a more limited aspect of the present invention, the power equalization device is a polarization independent acousto-optic tunable filter.

In accordance with a more limited aspect of the present invention, the power equalization device includes at least one acousto-optic tunable filter driven by the RF acoustic control signals from the feedback loop in a bar-state, wherein the acousto-optic tunable filter functions as a multichannel notch filer.

In accordance with a more limited aspect of the present invention, the power equalization device includes at least one acousto-optic tunable filter driven by the RF acoustic control signals from the feedback loop in a cross-state, wherein the acousto-optic tunable filter functions as a multichannel transmission filter.

In accordance with a more limited aspect of the present invention, the feedback loop includes, at the module output end, a splitter which separates the potion of the output received from the module output into individual channels. A plurality of optical filters, each optical filter connected in series with a corresponding channel, filter-out wavelengths that do not correspond to the characteristic wavelength of the channel. A plurality of photodetectors are connect to the optical filters such that each photodetector receives a corresponding channel. The photodetectors produce signals representative of the powers of the different channels. A dynamic control circuit is connected to the plurality of photodetectors such that the dynamic control circuit receives the signals produced by the photodetectors, compares the signals produced by the photodetectors to determine relative powers of the different channels, and generates the RF acoustic control signals that drive the power equalization device based on the dynamic control circuit's comparison.

In accordance with another aspect of the present invention, a dynamic power control module for an optical network is provided. It includes a module input which receives an optical transmission containing multiple channels. Each channel has a different characteristic wavelength and power. A power control system receives the optical transmission from the module input. The power control system is driven by control signals to independently regulate the power of each channel. A module output receives the optical transmission from the power control system. A feedback loop samples the optical transmission from the module output. The feedback loop measures the power of each individual channel and in response to those measurements generates the control signals that drive the power control system. The power control system is driven so that the power of each channel at the module output is at a desired level.

In accordance with a more limited aspect of the present invention, the feedback loop includes a divider that spectrally separates the sampling of the optical transmission into individual channels which are received by a plurality of photodetectors such that the individual channels are each measured by a separate photodetector. Each photodetector generates an electrical signal representative of the power of the channel it is measuring.

In accordance with a more limited aspect of the present invention, the photodetectors are PIN detectors.

In accordance with a more limited aspect of the present invention, the feedback loop includes a scanning optical spectrometer for measuring the power of each individual channel.

In accordance with a more limited aspect of the present invention, an acousto-optic tunable filter functions as the scanning optical spectrometer.

In accordance with a more limited aspect of the present invention, the power control system includes a divider that spectrally separates the optical transmission from the module input into individual channels. An array of optical modulators driven by the control signals are arranged to receive the individual channels such that each channel is regulated by a separate optical modulator. A recombiner receives the regulated channels and recombines them.

In accordance with a more limited aspect of the present invention, the optical modulators are polarization insensitive.

In accordance with a more limited aspect of the present invention, the optical modulators are acousto-optic modulators and the control signals are RF acoustic signals.

In accordance with a more limited aspect of the present invention, the divider is a dense wavelength-division-multiplexer.

In accordance with a more limited aspect of the present invention, the power control system is a single device driven by the control signals such that it separately regulates each individual channel of the optical transmission received from the module input without spectrally dividing the optical transmission into the individual channels.

In accordance with a more limited aspect of the present invention, the single device is a polarization independent acousto-optic filter and the control signals are RF acoustic control signals.

In accordance with a more limited aspect of the present invention, the power of each channel at the module output is maintained at substantially the same level.

In accordance with a more limited aspect of the present invention, a power differential between channels at the module output is less than 1 dB.

In accordance with a more limited aspect of the present invention, a difference in wavelength between adjacent channels is less than 3 nm.

In accordance with a more limited aspect of the present invention, the dynamic power control module has a dynamic response time faster than 0.1 $\mu$s.

In accordance with another aspect of the present invention, a method for dynamically equalizing power in an optical transmission having multiple channels is provided. It includes receiving the optical transmission having multiple channels. Each channel has a different characteristic wavelength and power. The optical transmission having the multiple channels is routed through a polarization insensitive power equalizer. Next, at least a portion of an output from the polarization insensitive power equalizer is taken and routed through a feedback loop. The power of the multiple channels in the feedback loop is dynamically compared relative to one another. RF acoustic control signals are generated in response to the comparison, and the power equalizer is driven with the RF acoustic control signals such that the multiple channels have substantially the same power.

In accordance with a more limited aspect of the present invention, the routing step of the method of includes spectrally separating the optical transmission by wavelength into an array of parallel transmissions such that each transmission corresponds to one of the multiple channels. The array of parallel transmissions are then routed through a parallel array of acousto-optic modulators driven by the RF acoustic control signals. The array of parallel transmissions is then recombined.

In accordance with a more limited aspect of the present invention, the dynamically comparing step of the method includes separating the portion routed through the feedback loop into multiple transmissions, each transmission including the multiple channels having different characteristic wavelengths. Each transmission is converted into separate channels by optically filtering out wavelengths from each transmission that do not correspond to the characteristic wavelength of the channel. Next, signals are generated representative of the powers of the channels, and the signals are dynamically compared relative to one another.

In accordance with a more limited aspect of the present invention, the routing step of the method includes routing the optical transmission through at least one acousto-optic tunable filter driven by the RF acoustic control signals such that the acousto-optic tunable filter functions as a notch filter in a bar-state.

In accordance with a more limited aspect of the present invention, the routing step of the method includes routing the optical transmission through at least one acousto-optic tunable filter driven by the RF acoustic control signals such that the acousto-optic tunable filter functions as a transmission filter in a cross-state.

One advantage of the present invention is that power differentials in a rapidly changing dynamic network are minimized.

Another advantage of the present invention is that changing system parameters are compensated for while maintaining uniformity of power across multiple channels.

Another advantage of the present invention is the high speed equalization of the powers across multiple channels.

Another advantage of the present invention is the flexibility of channel spacing across the wavelength spectrum.

Another advantage of the present invention is that it permits long-distance transmission while maintaining power equalization across multiple channels.

Another advantage of the present invention is that it compensates for gain non-uniformities associated with EDFA's.

Another advantage of the present invention is improved signal to noise ratio characteristics for a multi-channel optical network.

Another advantage of the present invention is minimized interchannel cross talk and sufficient gain for all channels of a multi-channel optical network.

Another advantage of the present invention is its insensitivity to polarization.

Another advantage of the present invention is the suppression of amplified spontaneous emission (ASE) allowing for a longer channel propagation distance.

Still further advantages of the invention will become apparent to those of ordinary skill in the art upon reading and understanding the following detailed description of the preferred embodiments.

BRIEF DESCRIPTION OF THE DRAWINGS

The invention may take form in various parts and arrangements of parts. The drawings are only for purposes of illustrating preferred embodiments and are not to be construed as limiting the invention.

DETAILED DESCRIPTION OF THE PREFERRED EMBODIMENTS

Figure 1A:
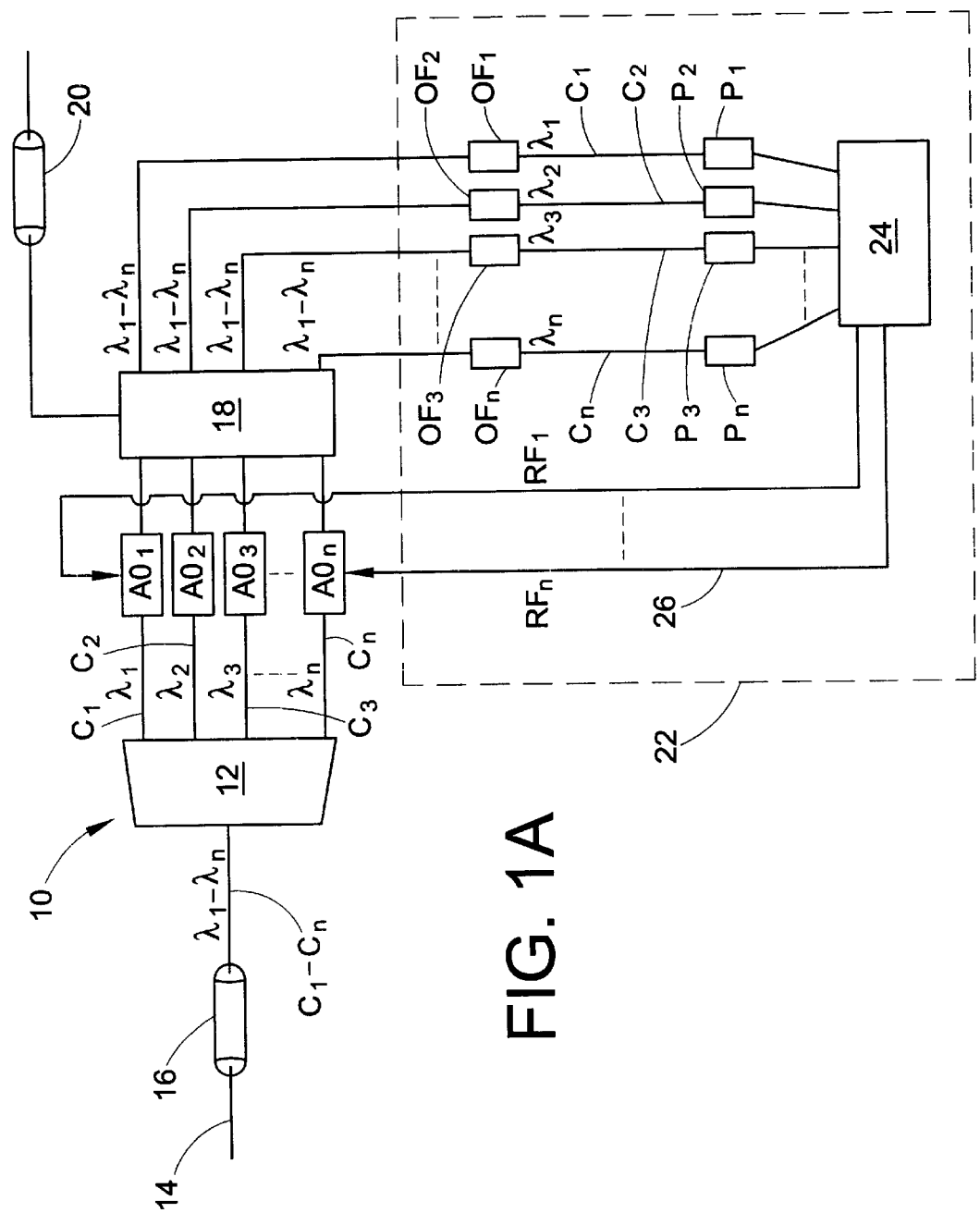
FIG. 1A is a diagrammatic illustration of a dynamic power equalization module in accordance with aspects of the present invention.

With reference to FIG. 1A, a dynamic power equalization module 10 for use in an optical network, optical data transmission, optical routing, and the like is illustrated in accordance with a preferred embodiment of the present invention. The module 10 includes a WDM, or optionally a dense wavelength-division-multiplexer (DWDM) 12 as illustrate, which receives an optical data transmission 14 via a module input 16. The input optical transmission 14 contains a plurality of different channels $C_1$–$C_n$. Each channel $C_1$–$C_n$ has a different corresponding characteristic wavelength $\lambda_1$–$\lambda_n$. Moreover, each channel $C_1$–$C_n$ has a different dynamically varying power due to various changing network and/or system parameters, non-uniform gain from EDFA cascades, and the like. The DWDM 12 spectrally, by the characteristic wavelengths $\lambda_1$–$\lambda_n$, separates the input optical transmission 14 into parallel paths such that each path corresponds to a different channel $C_1$–$C_n$. In a preferred embodiment, the DWDM 12 has channel spacings of approximately 1 nm. The parallel paths are then routed through a parallel array of acousto-optic modulators $AO_1$–$AO_n$ which are driven by radio frequency (RF) acoustic signals. In a preferred embodiment, the acousto-optic modulators $AO_1$–$AO_n$ have less than 1 μs rise/fall times and are polarization insensitive. Optionally, each modulator may be distinct separate elements as illustrate or the modulators may be an integrated array of modulators. Moreover, while for purposes herein discussion is limited to acousto-optic modulators, various other optical modulator arrays may be employed as design preferences suggest for different application. Suitable examples include but are not limited to: an array of Mach-Zehnder interferometer modulators, directional coupler modulator arrays, or any analog-tunable optical intensity modulator.

The outputs of the acousto-optic modulators $AO_1$–$AO_n$ are collected by a coupler 18 which passively recombines the paths so that all the channels $C_1$–$C_n$ are carried simultaneously. The coupler 18 then relays the recombined optical transmission to a module output 20 and at least a portion of the recombined transmission is relayed to a number of coupler outputs that are utilized by a feedback loop 22. Each of the coupler outputs contains all the channels $C_1$–$C_n$ having characteristic wavelengths $\lambda_1$–$\lambda_n$. In the feedback loop 22, the coupler outputs are fed through a plurality of optical filters $OF_1$–$OF_n$. Each of the optical filter $OF_1$–$OF_n$ converts the coupler outputs into separate channels $C_1$–$C_n$ by filtering out wavelengths that do not correspond to the characteristic wavelength $\lambda_1$–$\lambda_n$ of the channel $C_1$–$C_n$ in which they are being transmitted. That is to say, the optical filter $OF_1$ filters out those wavelengths that do not correspond to the characteristic wavelength $\lambda_1$ thereby converting that line to channel $C_1$, and so on for the other channels.

Figure 1B:
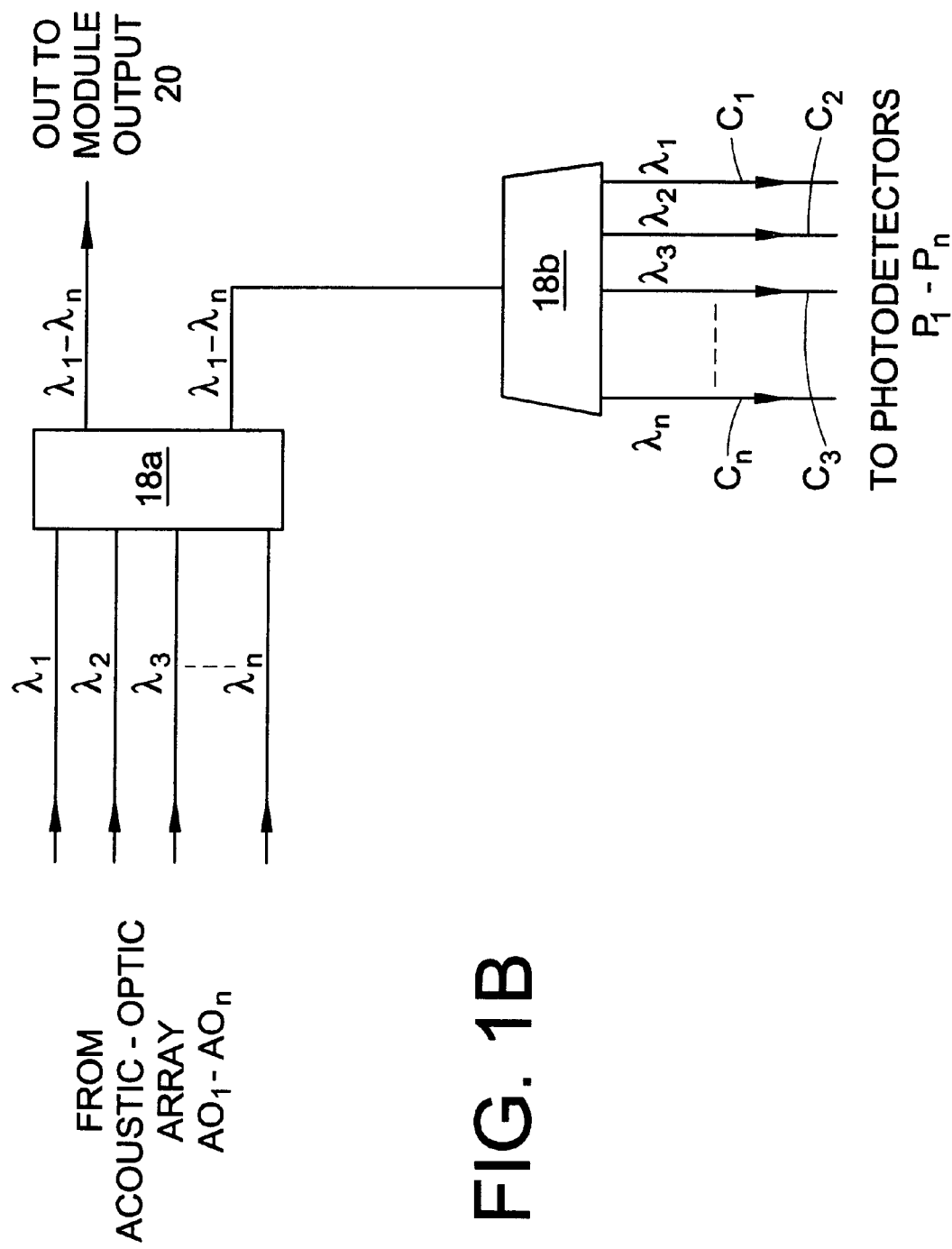
FIG. 1B is a diagrammatic illustration of an alternate configuration replacing the coupler and optical filter bank illustrated in FIG. 1A.

With reference to FIG. 1B and continuing reference to FIG. 1A, an alternate configuration is illustrated for relaying the output of the acousto-optic modulator array $AO_1$–$AO_n$ to the module output 20 and the feedback loop 22. This configuration replaces the coupler 18 and optical filter bank $OF_1$–$OF_n$, with an alternate coupler 18a and wavelength selective divider, optionally a second WDM 18b as illustrated. Note also that coupler 18a may also be a third WDM functioning to recombine the channels $C_1$–$C_n$ in which case a portion of its output could be tapped off and routed to the feedback loop through WDM 18b.

In any case, the separate channels $C_1$–$C_n$ are coupled to photodetectors, such as the PIN detectors $P_1$–$P_n$ illustrated. The PIN detectors $P_1$–$P_n$ produce electrical signals representative and/or proportional to the power of the channel $C_1$–$C_n$ coupled thereto. A dynamic control circuit 24 receives the electrical signals and compares them to determine the relative power of the different channels $C_1$–$C_n$. Based on the comparison, the control circuit 24 generates the RF acoustic signals 26 which drive the acousto-optic modulators $AO_1$–$AO_n$ such that each acousto-optic modulator $AO_1$–$AO_n$ dynamically controls its respective channels' transmission therethrough, hence equalizing the power of each channel $C_1$–$C_n$ at the module output 20. In this manner, the module 10 can utilizes each acousto-optic modulator $AO_1$–$AO_n$ independently as loss elements to reduce and/or attenuate the power of each individual channel $C_1$–$C_n$ to be substantially equal to that of a reference. Moreover, by combining the acousto-optic modulators $AO_1$–$AO_n$ with the DWDM 12 (i.e., an integrated frequency router) and the feedback control loop 22, all the channels $C_1$–$C_n$ are independently equalized with channel spacings being as small or as large as can be accommodated by the DWDM 12.

Figure 2A:
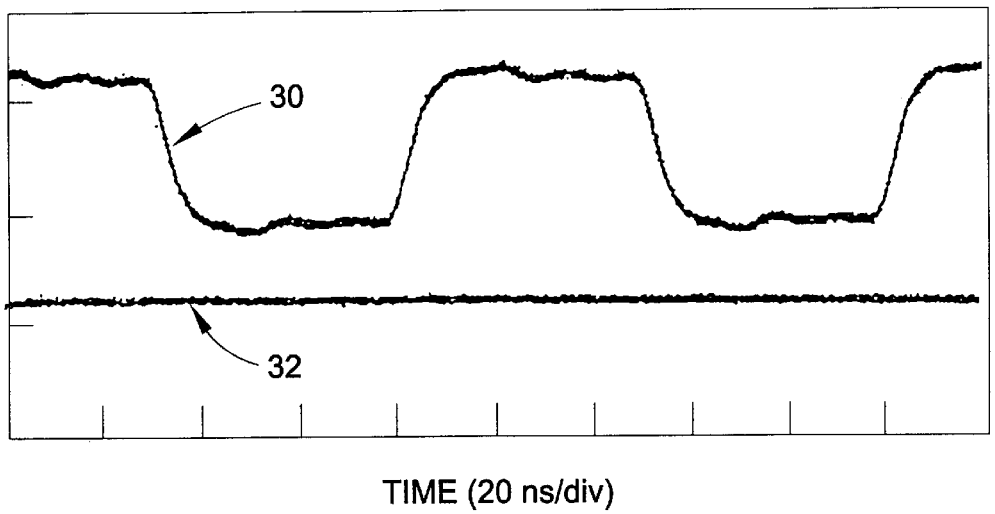
FIGS. 2A and 2B are graphical representations showing the time response of the dynamic power equalization module illustrated in FIG. 1A.
Figure 2B:
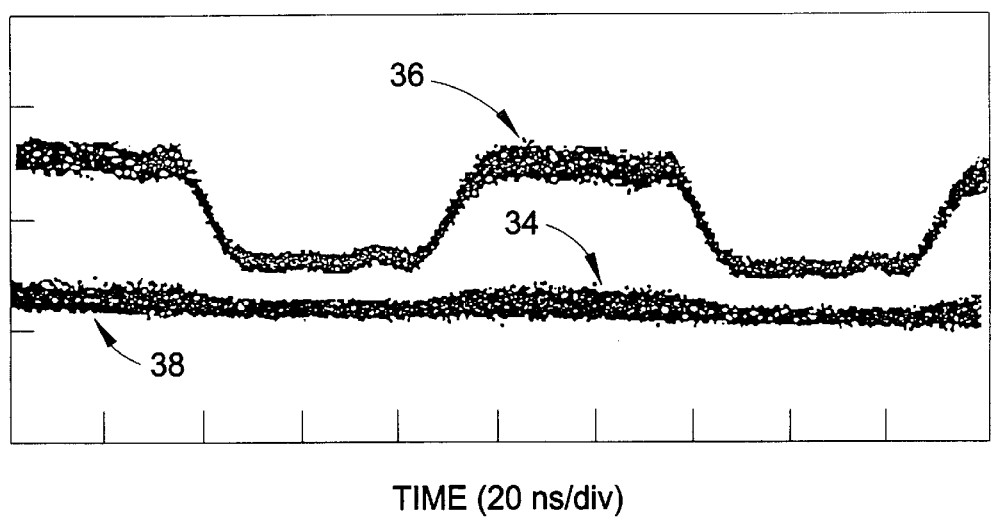

FIGS. 2A and 2B show the time response of a preferred embodiment of the dynamic equalization module 10 as illustrated in FIG. 1A. With reference to FIG. 2A, a 1560.3 nm input signal 30 is modulated by a 10 MHZ square wave reproducing dynamic power variations. The signal 32 is a 1552.3 nm input reference signal with an optical power approximately 5 dB lower than the input signal 30. With reference to FIG. 2B, the output signals 34 and 36 are the modulated signal 30 with equalization and without equalization by the module 10, respectively. The signal 38, it the output reference signal. While a small modulation residue remains, the module 10 has equalized the modulated signal 30 and the reference signal 32 to within approximately 1 dB, with a dynamic response time of approximately 0.1 μs.

Figure 3A:
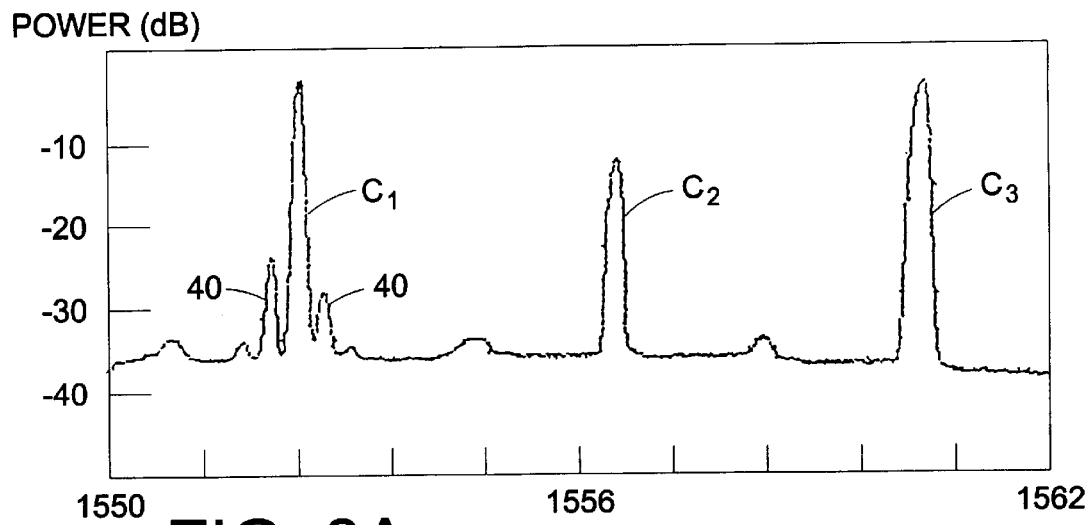
FIGS. 3A through 3C are graphical representations showing the equalization performance of the dynamic power equalization module illustrated in FIG. 1A.
Figure 3B:
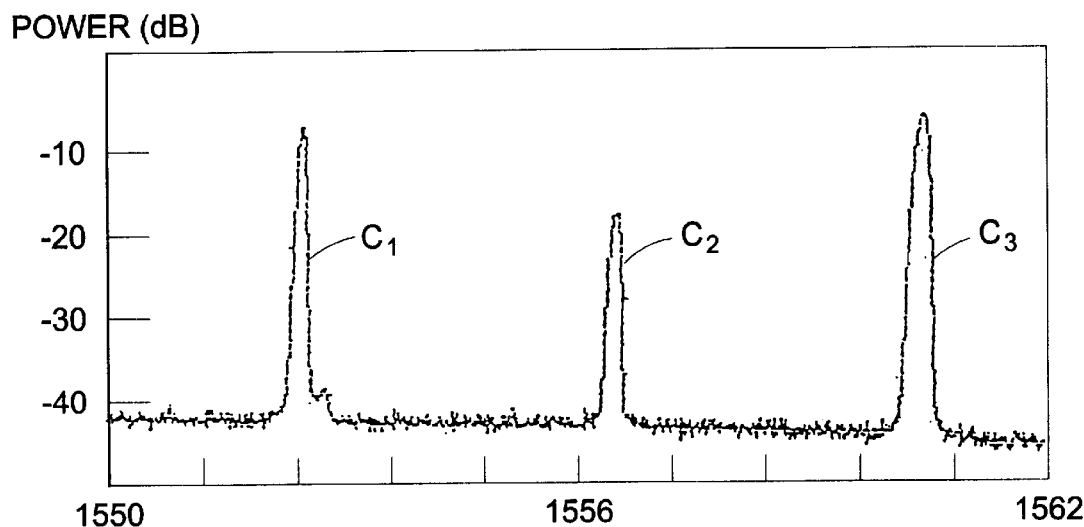
Figure 3C:
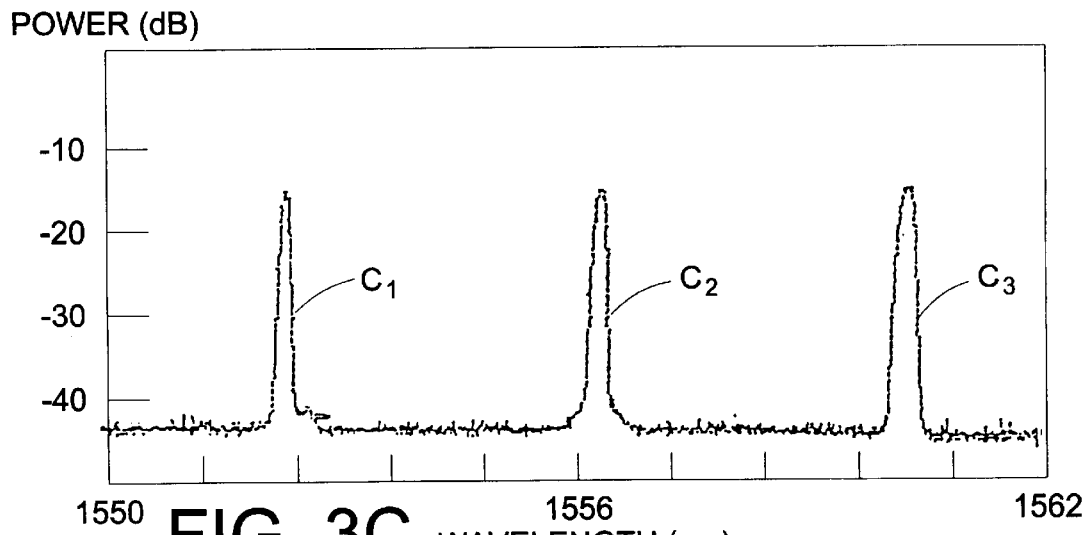

FIGS. 3A through 3C illustrate the equalization performance of the module 10 in a preferred embodiment. With reference to FIG. 3A, the input optical transmission 14 contains three channels $C_1$–$C_3$ represented by signal peaks having differing optical powers of approximately 10 dB. The characteristic wavelengths are $\lambda_1$=1552.3 nm, $\lambda_2$=1556.3 nm, and $\lambda_3$=1560.3 nm, respectively. Channel $C_2$ is the reference. FIG. 3B illustrates the output without power equalization from the module 10. The power differential remains approximately 10 dB, with the sidelobes 40 (see FIG. 3A) of the input signal 14 removed by the filtering function of the DWDM 12. FIG. 3C illustrates the output with power equalization from the module 10 equalizing the power differential to within approximately 1 dB.

Figure 4A:
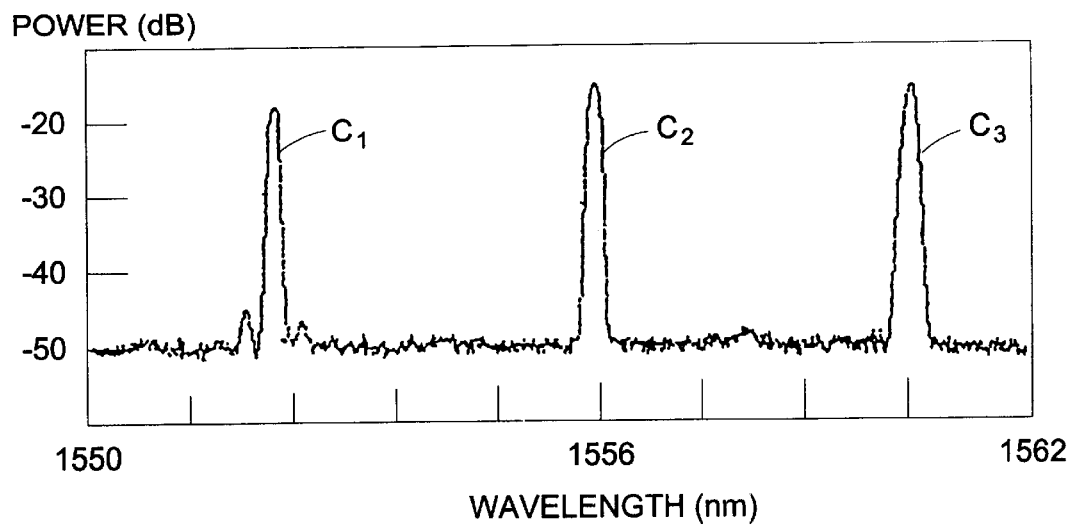
FIGS. 4A through 4D are graphical representations showing the equalization performance of the dynamic power equalization module illustrated in FIG. 1A in a long distance recirculating loop.
Figure 4B:
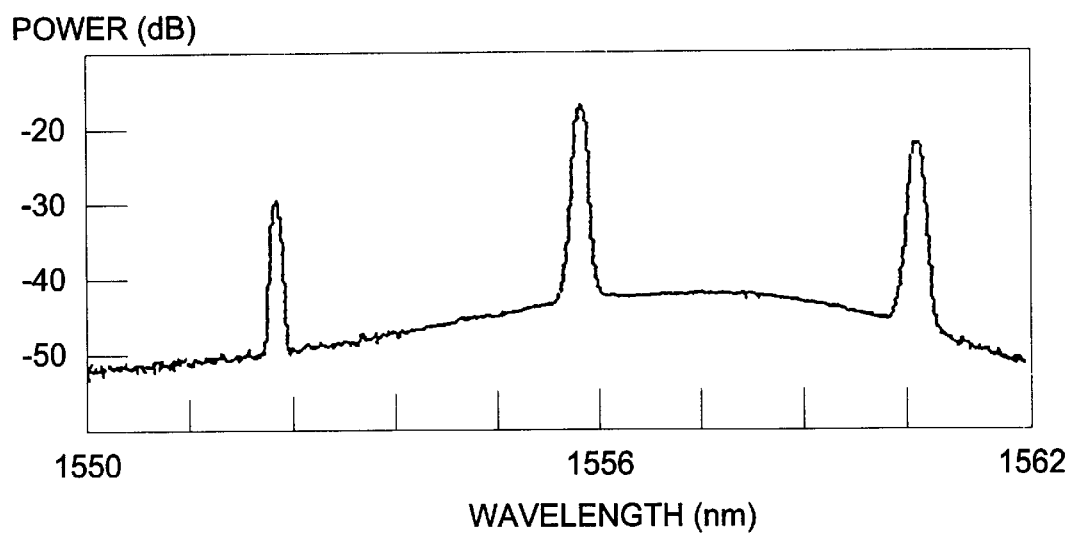
Figure 4C:
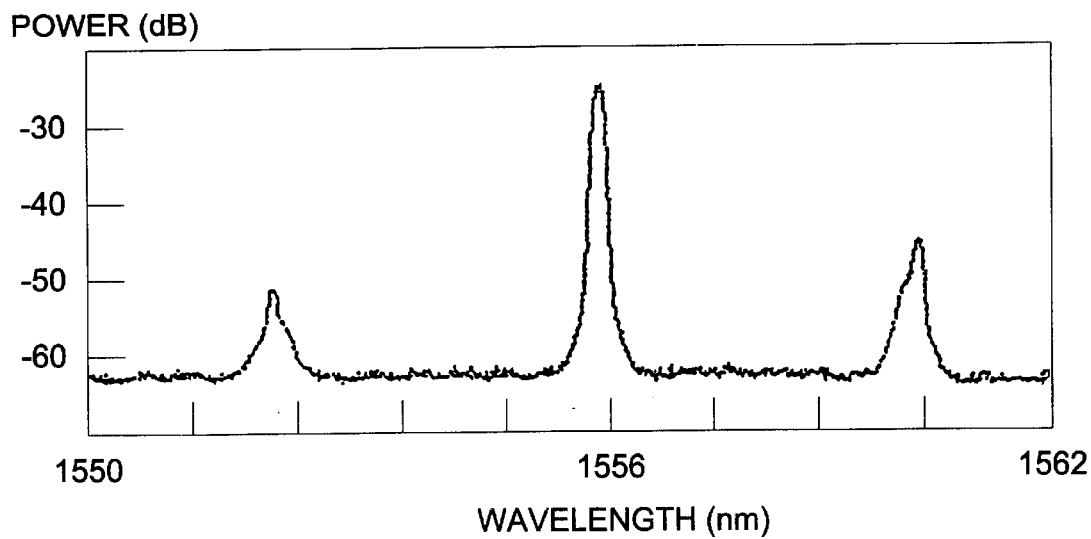
Figure 4D:
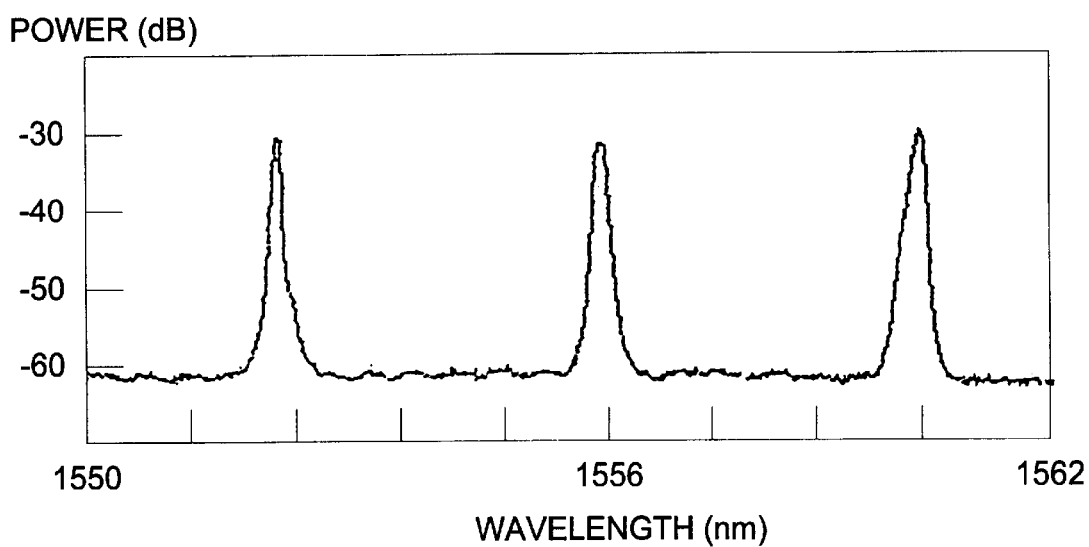

FIGS. 4A through 4D illustrate the performance of a preferred embodiment of the module 10 after long distance transmission in a recirculating loop including a chain of EDFA's. FIG. 4A shows the optical transmission input into the loop; FIG. 4B shows the optical transmission after propagating 1,000 km through the loop and prior to being input into the module 10 (this corresponds to the input optical transmission 14); FIG. 4C shows the output post module 10 without active equalization from the module 10; and, FIG. 4D shows the output with active equalization from the module 10 equalizing the power differential to within approximately 1 dB. Note from FIG. 4C, that with the module 10 inserted with no active equalization feedback from the control circuit 24, the DWDM 12 will simply act as a multi-wavelength filter which suppresses the accumulated amplified spontaneous emission (ASE) between channels.

Figure 5A:
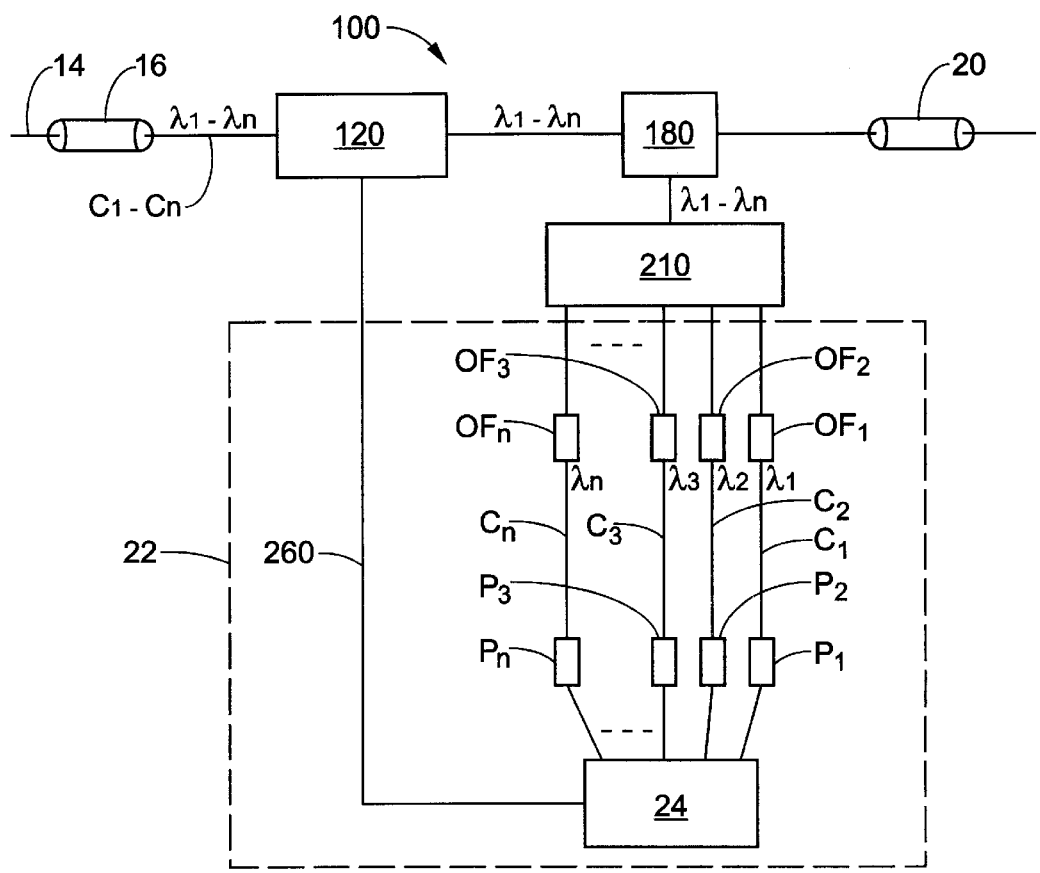
FIG. 5A is a diagrammatic illustration of an alternate embodiment of the dynamic power equalization module in accordance with aspects of the present invention.

With reference to FIG. 5A, a dynamic power equalization module 100 for use in an optical network, optical data transmission, optical routing, and the like is illustrated in accordance with another preferred embodiment of the present invention. The module 100 includes a polarization insensitive power equalization device 120 driven by RF acoustic control signals connected between the module input 16 which receives the optical data transmission 14 and the module output 20. As before, the input optical transmission 14 contains a plurality of different channels $C_1$–$C_n$. Each channel $C_1$–$C_n$ has a different corresponding characteristic wavelength $\lambda_1$–$\lambda_n$. Moreover, each channel $C_1$–$C_n$ has a different dynamically varying power. For this embodiment, the power equalization device 120 does not spectrally separate the optical transmission 14 into individual channels $C_1$–$C_n$ and at its output the optical transmission still carries all the channels $C_1$–$C_n$ in combined form.

A coupler, optionally a 90/10% coupler 180 as illustrated, taps off at least a portion of the output from the power equalization device 120 with out causing substantial power loss to the module output 20. The tapped off portion is then divided by a splitter 210 into a number of splitter outputs that are utilized by the feedback loop 22. Note that as before, a wavelength selective divider such as a WDM that separates the transmission into channels $C_1$–$C_n$ may be substituted for the splitter 210 thereby dispensing with the optical filter bank $OF_1$–$OF_n$. However in the illustrated embodiment, each of the splitter outputs contains all the channels $C_1$–$C_n$ having characteristic wavelengths $\lambda_1$–$\lambda_n$. As before, in the feedback loop 22, the splitter outputs are fed through a plurality of optical filters $OF_{1-OFn}$. Each of the optical filter $OF_1$–$OF_n$ converts the splitter outputs into separate channels $C_1$–$C_n$ by filtering out wavelengths that do not correspond to the characteristic wavelength $\lambda_1$–$\lambda_n$ of the channel $C_1$–$C_n$ in which they are being transmitted. Thereafter, the separate channels $C_1$–$C_n$ are coupled to photodetectors, such as the PIN detectors $P_1$–$P_n$ illustrated. The PIN detectors $P_1$–$P_n$ produce electrical signals representative and/or proportional to the power of the channel $C_1$–$C_n$ coupled thereto. A dynamic control circuit 24 receives the electrical signals and compares them to determine the relative power of the different channels $C_1$–$C_n$. Based on the comparison, the control circuit 24 generates the RF acoustic control signals 260 which drive the power equalization device 120 thereby equalizing the power of the channels $C_1$–$C_n$ at the module output 20.

Figure 5B:
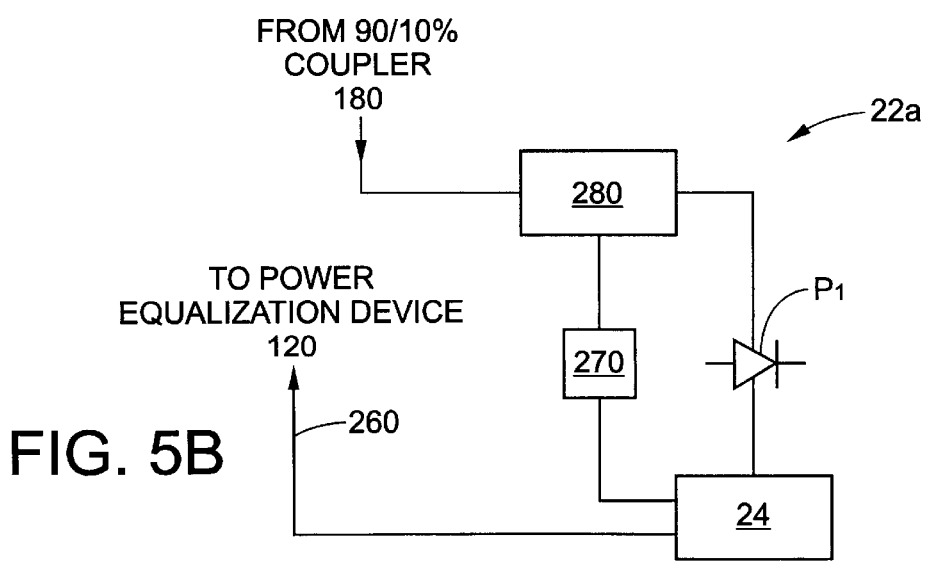
FIG. 5B is a diagrammatic illustration of an alternate embodiment of the feedback loop in accordance with aspects of the present invention.

With reference to FIG. 5B and continuing reference to FIG. 5A, an alternate embodiment of the feedback loop 22a is illustrated. The feedback loop 22a utilizes a monitor acousto-optic tunable filter (AOTF) 280 as a scanning optical spectrometer. Optionally, any appropriate optical spectrum analyzer may be substituted. The AOTF 280 receives the optical transmission containing the combination of channels $C_1$–$C_n$ and its output is routed to PIN detector $P_1$ which relays its signal to the control circuit 24. Under the direction of the control circuit 24, a signal generator 270 drives the monitor AOTF 280. In a preferred embodiment, the signal generator 270 drives the monitor AOTF 280 with a frequency-swept RF signal dithered at 100 kHz with a 20 kHz modulation depth. Alternately, the signal generator 270 may be integrated with the control circuit. The monitoring optical signal is measured by phase-sensitive detection of the spectrum to obtain a derivative signal. The crossings define the optical wavelengths and the amplitudes of the signal relate to the optical powers. The integral of the detected signal is the convolution of the optical spectrum and the AOTF filter function. As before, the control circuit 24 also drives the power equalization device 120. Note that the control circuit may include any number of different circuits which perform the various tasks.

Figure 6A:
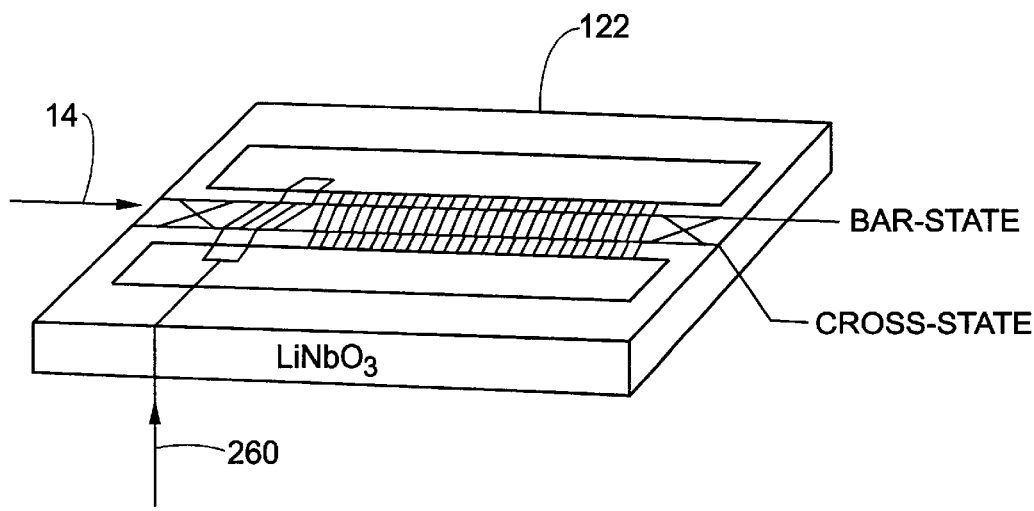
FIGS. 6A and 6B are diagrammatic illustrations of alternate configurations for the power equalization device illustrated in FIG. 5A in accordance with aspects of the present invention.
Figure 6B:
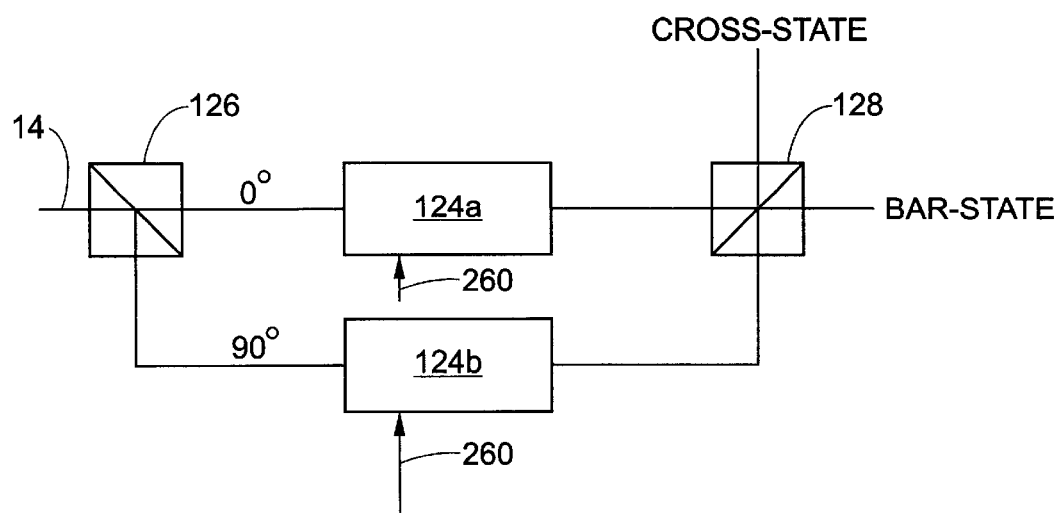

With reference to FIGS. 6A and 6B, alternate configurations for two preferred embodiments of the power equalization device 120 are illustrated utilizing acousto-optic tunable filters (AOTF). The AOTF can generally respond on the order of microseconds and acts as a multiple-passband filter with independent control of each wavelength passband. The configuration in FIG. 6A includes a polarization independent acousto-optic tunable filter 122 (PIAOTF). The configuration in FIG. 6B includes a pair of AOTF's 124a, 124b, an input polarizing beam splitter 126, and an output polarizing beam splitter 128.

In either configuration, the device 120 is polarization insensitive. While the AOTF filtering process is intrinsically polarization sensitive, polarization insensitivity is achieved in the FIG. 6A configuration by utilizing the PIAOTF 122 which includes the integration of two devices on one substrate. In the FIG. 6B configuration, to achieve polarization insensitivity, the incoming optical transmission 14 is (1) decomposed into two orthogonal polarization states by the input polarizing beam splitter 126, (2) filtered by their respective AOTF's 124a, 124b, and then (3) recombined at the output polarizing beam splitter 128.

Figure 7A:
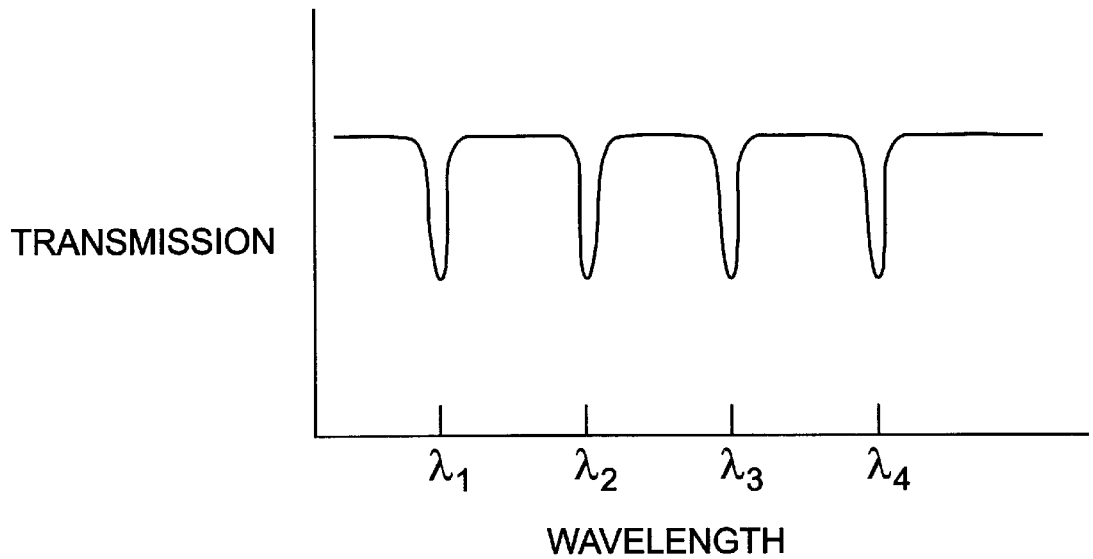
FIGS. 7A and 7B are graphical representations of the wavelength dependent transmission characteristics corresponding to bar-state and cross-state operation of the power equalization device respectively in accordance with aspects of the present invention.
Figure 7B:
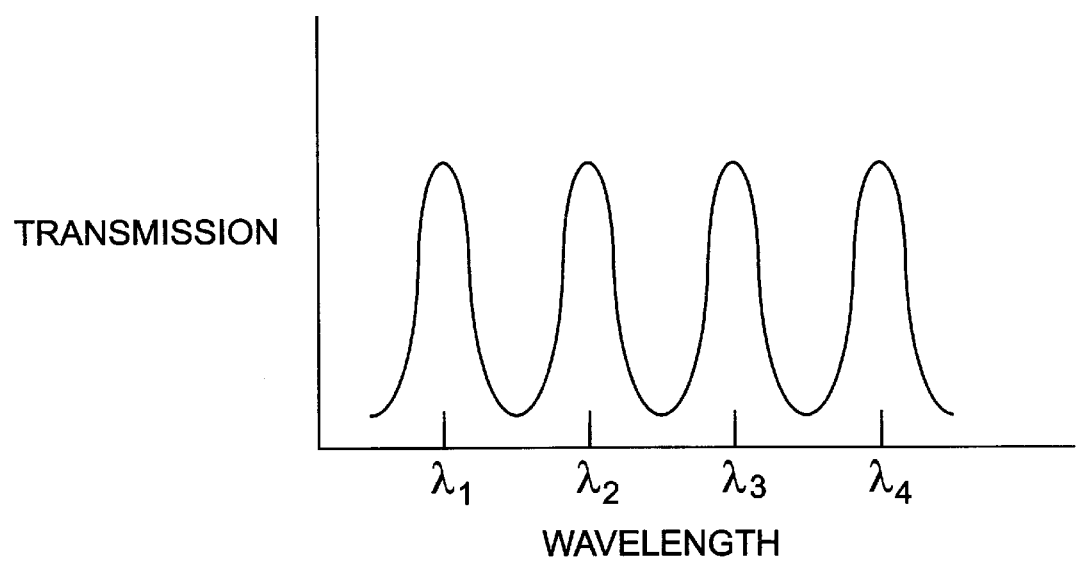

In either configuration, the device 120 can optionally be driven in either (1) a bar-state as a multichannel notch filter (see FIG. 7A showing the wavelength dependent transmission characteristics in the barstate) or (2) a cross-state as a multichannel transmission filter (see FIG. 7B showing the wavelength dependent transmission characteristics in the cross-state). In the bar-state, the notch depths of the different wavelengths $\lambda_1$–$\lambda_n$ are adjusted to appropriately attenuate each channel $C_1$–$C_n$ to a reference level thereby equalizing power differentials therebetween. The advantages of operating the device 120 in the bar-state including: fail-safe operation, that is the module 100 continues to transmit (albeit non-equalized output) if control is absent; lower drive power because only that acoustic power is applied which is needed to decrease a given channel $C_1$–$C_n$ to the reference level; no imposition of an optical frequency shift as may be associated with the cross-state; and, the filter does not have to be narrower than the individual channel separation. In the cross-state, each channel $C_1$–$C_n$ represented by its characteristic wavelength $\lambda_1$–$\lambda_n$ rests atop a different transmission filter passband. The advantage in using the device 120 in the cross-state is that the filter serves to suppress ASE in the transmission.

Figure 8A:
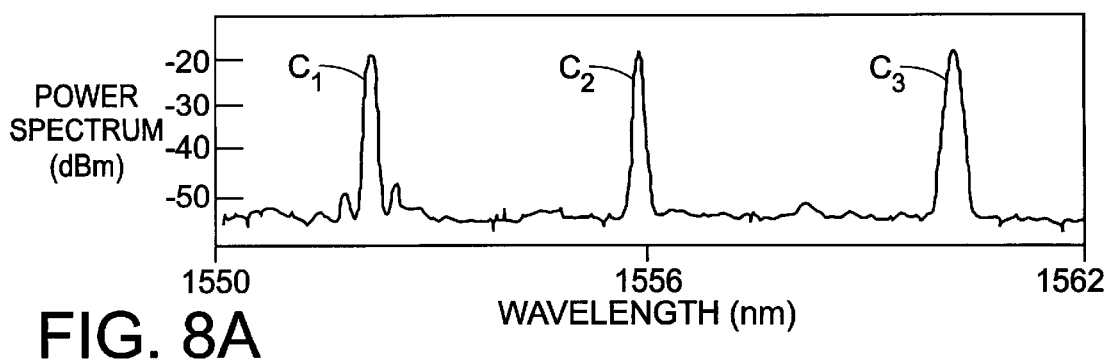
FIGS. 8A through 8D are graphical representations showing the equalization performance of the dynamic power equalization module illustrated in FIG. 5A operated in the bar-state in a long distance recirculating loop; and, FIGS. 9A through 9D are graphical representations showing the equalization performance of the dynamic power equalization module illustrated in FIG. 5A operated in the cross-state in a long distance recirculating loop.
Figure 8B:
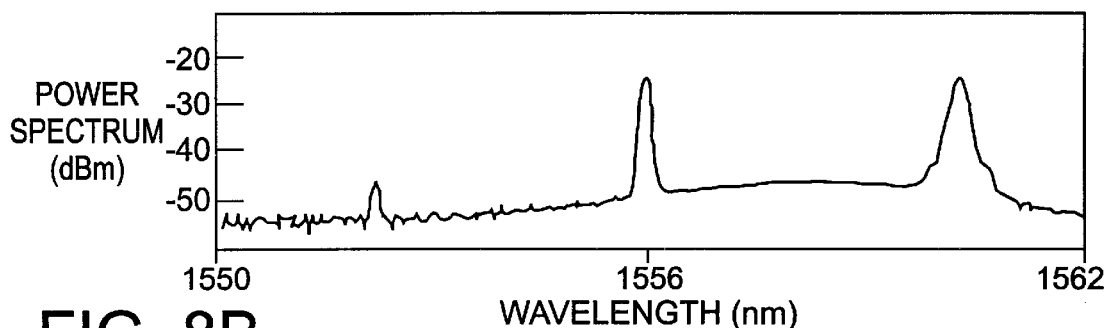
Figure 8C:
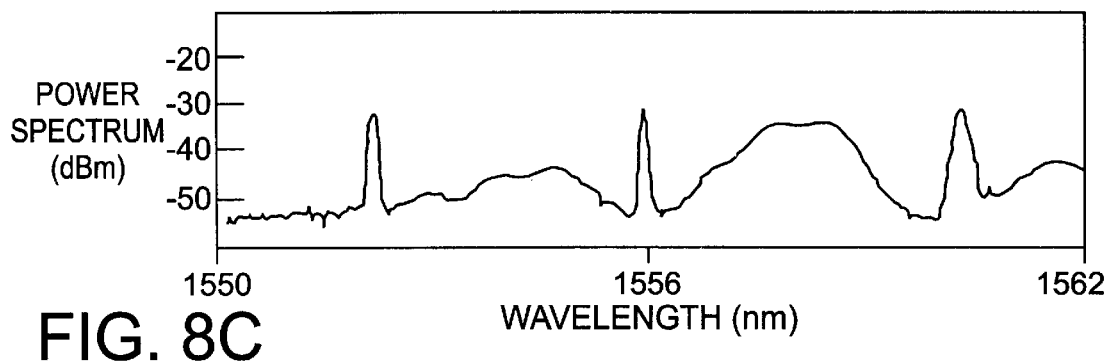
Figure 8D:
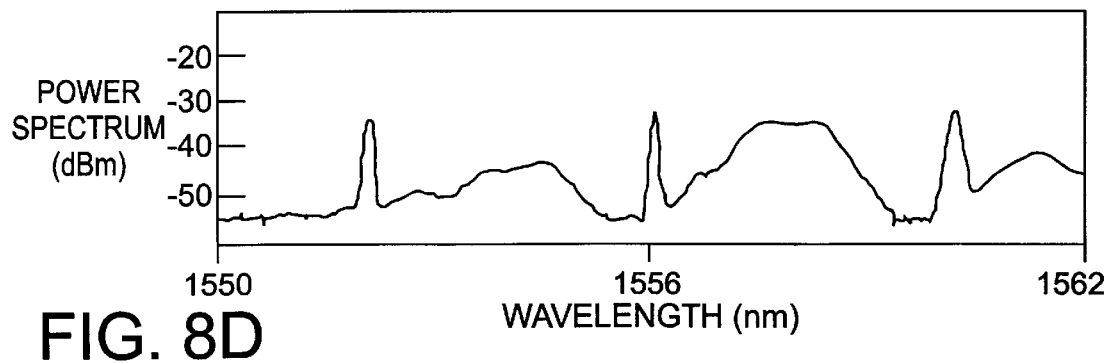

FIGS. 8A through 8D illustrate the performance of a preferred embodiment of the module 100 (using the configuration of FIG. 6B in the bar-state) after long distance transmission in a recirculating loop including a chain of approximately 30 EDFA's. The input optical transmission contains three 2.5 Gb/s channels $C_{1-C3}$ represented by the signal peaks. The characteristic wavelengths are $\lambda_1$=1552.0 nm, $\lambda_2$=1555.8 nm, and $\lambda_3$=1560.2 nm, respectively. Channel $C_1$ is the reference 8A shows the optical transmission input into the loop; FIG. 8B shows the optical transmission after propagating 1,000 km through the loop and prior to being input into the module 100 (this corresponds to the input optical transmission 14); FIG. 8C shows the output with active equalization from the module 100 equalizing the power differential to within approximately 1 dB with all channels achieving high SNR; and, FIG. 8D shows the output with active equalization from the module 100 when the power of channel $C_2$ is increased 3 dB.

Figure 9A:
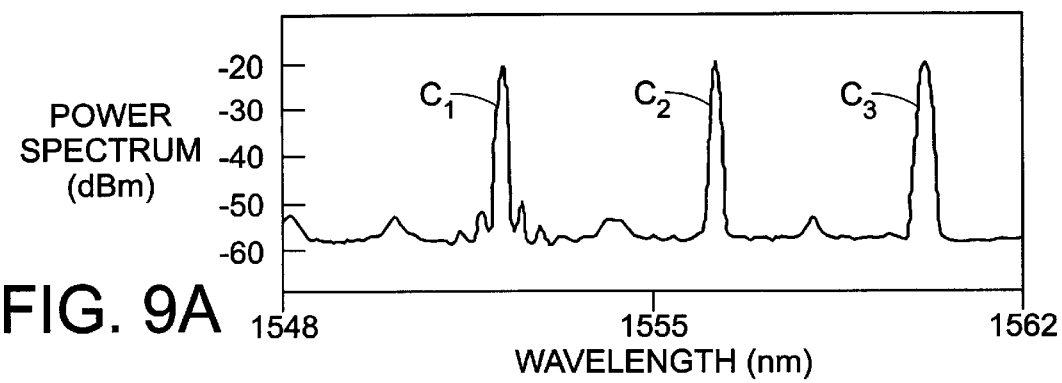
Figure 9B:
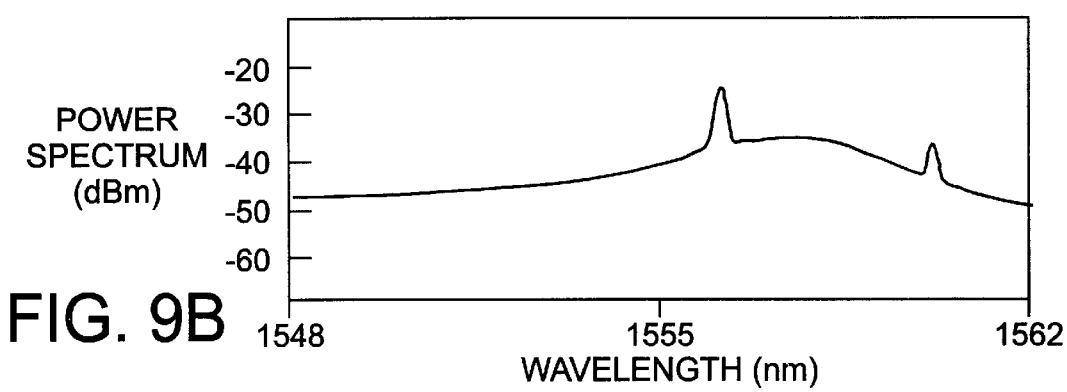
Figure 9C:
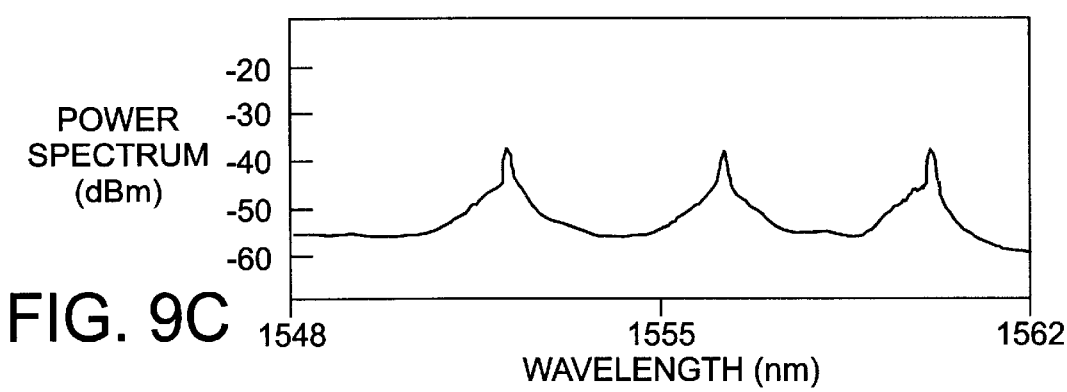
Figure 9D:
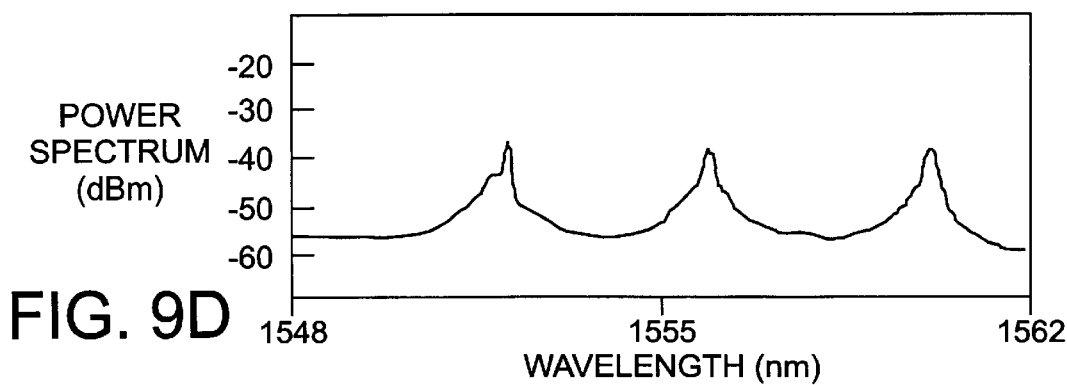

FIGS. 9A through 9D illustrate the performance of a preferred embodiment of the module 100 (using the configuration of FIG. 6B in the cross-state) after long distance transmission in a recirculating loop including a chain of EDFA's. The input optical transmission contains three 2.5 Gb/s channels $C_1$–$C_3$ represented by the signal peaks. The characteristic wavelengths are $\lambda_1$=1552.4 nm, $\lambda_2$=1556.3 nm, and $\lambda_3$=1560.2 nm, respectively. Channel $C_1$ is the reference. FIG. 9A shows the optical transmission input into the loop; FIG. 9B shows the optical transmission after propagating 2,500 km through the loop and prior to being input into the module 100 (this corresponds to the input optical transmission 14, note channel $C_1$ is overcome by ASE); FIG. 9C shows the output with active equalization from the module 100 equalizing the power differential to within approximately 1 dB with all channels achieving high SNR; and, FIG. 9D shows the output with active equalization from the module 100 when the power of channel $C_2$ is decreased 5 dB.

Generally, it is to be appreciated that the various alternate embodiments and/or configuration described herein are interchangeable where appropriate and the possible combinations are not limited to those detailed above. That is to say for example, that while the alternate configuration illustrated in FIG. 1B has been detail with reference to FIG. 1A it is also amenable to incorporation with the embodiment illustrated in FIG. 5A with only minor variations. Likewise, the configuration illustrated in 5B is compatible with that illustrated in FIG. 1A. Moreover, while the above has referenced power equalization, the module 10, 100 is also employable as an arbitrary power control. In general terms, the module 10, 100 monitors a plurality of wavelength channel powers and separately regulates the power on each channel so as to adjust that power in a programmable manner. If desired, it can accommodate a different than equal power distribution. This may be to compensate for wavelength-dependent differences elsewhere in the network, or to create a specific spectral loss profile for other reasons. That is to say, a programmable spectral loss element is the more general function performed by the module 10, 100.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims and the equivalents thereof.

Having thus described the preferred embodiments, the invention is now claimed to be:

1. A dynamic power equalization module for an optical network comprising:

a wavelength-division-multiplexer having an optical input for receiving an optical data transmission containing a plurality of different channels each with correspondingly different wavelengths, wherein the wavelength-division-multiplexer spectrally separates the optical data transmission received by the optical input into parallel optical outputs which correspond to the different channels;

a parallel array of acousto-optic modulators driven by RF acoustic signals connected to the optical outputs of the wavelength-division-multiplexer;

a coupler which passively combines optical outputs from the parallel array of acousto-optic modulators such that the combined optical outputs from the parallel array of acousto-optic modulators is relayed to a plurality of coupler outputs corresponding to a feedback loop for the different channels and at least one coupler output corresponding to a dynamic power equalization module output;

a plurality of optical filters connected to the coupler outputs corresponding to the feedback loop, each optical filter filtering out wavelengths that do not correspond to the channel in which they are being transmitted;

a plurality photodetectors each receiving an output from corresponding optical filters such that the plurality of photodetectors produce signals representative of powers of the different channels; and, a dynamic control circuit which compares the signals produced by the plurality of photodetectors to determine relative power of the different channels and generates the RF acoustic signals that drive the parallel array of acousto-optic modulators such that each acousto-optic modulator dynamically controls each channels' transmission and reduces its power level to be substantially the same as that of a reference channel.

2. A dynamic power equalization module for an optical network comprising:

a module input for receiving an optical transmission containing a combination of different channels, each channel having a characteristic wavelength and power;

a power equalization device connected between the module input and a module output, the power equalization device being driven by RF acoustic control signals; and, a feedback loop which receives at least a portion of output from the module output and generates, based upon a comparison of relative powers of the different channels, the RF acoustic control signals which drive the power equalization device such that the power equalization device dynamically controls transmission of the different channels to substantially equalize power differentials therebetween, said power equalization device including at least one acousto-optic tunable filter driven by the RF acoustic control signals from the feedback loop in a bar-state, wherein the acousto-optic tunable filter functions as a multi-channel notch filer.

3. A dynamic power equalization module for an optical network comprising:

a module input for receiving an optical transmission containing a combination of different channels, each channel having a characteristic wavelength and power;

a power equalization device connected between the module input and a module output, the power equalization device being driven by RF acoustic control signals; and, a feedback loop which receives at least a portion of output from the module output and generates, based upon a comparison of relative powers of the different channels, the RF acoustic control signals which drive the power equalization device such that the power equalization device dynamically controls transmission of the different channels to substantially equalize power differentials therebetween, said power equalization device including at least one acousto-optic tunable filter driven by the RF acoustic control signals from the feedback loop in a cross-state, wherein the acousto-optic tunable filter functions as a multi-channel transmission filter.

4. The dynamic power equalization module of claim 3, wherein the feedback loop includes:

at the module output end, a splitter which separates the potion of the output received from the module output into individual channels;

a plurality of optical filters, each optical filter connected in series with a corresponding channel such that the optical filter filters-out wavelengths that do not correspond to the characteristic wavelength of the channel;

a plurality of photodetectors connect to the optical filters such that each photodetector receives a corresponding channel, the photodetectors producing signals representative of the powers of the different channels; and, a dynamic control circuit connected to the plurality of photodetectors such that the dynamic control circuit receives the signals produced by the photodetectors, compares the signals produced by the photodetectors to determine relative powers of the different channels, and generates the RF acoustic control signals that drive the power equalization device based on the dynamic control circuit's comparison.

5. A dynamic power control module for an optical network comprising:
- a module input which receives an optical transmission containing multiple channels wherein each channel has a characteristic wavelength and power;
- a power control system which receives the optical transmission from the module input, the power control system being driven by RF acoustic control signals to independently regulate the power of each channel, said power control system including:
  - a divider that spectrally separates the optical transmission from the module input into individual channels;
  - an array of acousto-optic modulators driven by the RF acoustic control signals, the array of acousto-optic modulators being arranged to receive the individual channels such that each channel is regulated by a separate acousto-optic modulator; and,
  - a recombiner that receives the regulated channels and recombines them;
- a module output which receives the optical transmission from the power control system; and,
- a feedback loop which samples the optical transmission from the module output, wherein the feedback loop measures the power of each individual channel and in response to those measurements generates the RF acoustic control signals that drive the power control system so that the power of each channel at the module output is at a desired level.

6. The dynamic power control module of claim 5, wherein the feedback loop includes:
- a divider that spectrally separates the sampling of the optical transmission into individual channels which are received by a plurality of photodetectors such that the individual channels are each measured by a separate photodetector that generates an electrical signal representative of the power of the channel it is measuring.

7. The dynamic power control module of claim 6, wherein the photodetectors are PIN detectors.

8. The dynamic power control module of claim 5, wherein the feedback loop includes a scanning optical spectrometer for measuring the power of each individual channel.

9. The dynamic power control module of claim 8, wherein an acousto-optic tunable filter functions as the scanning optical spectrometer.

10. The dynamic power control module of claim 5, wherein the acousto-optic modulators are polarization insensitive.

11. The dynamic power control module of claim 5, wherein the divider is a dense wavelength-division-multiplexer.

12. The dynamic power control module of claim 5, wherein the power of each channel at the module output is maintained at substantially the same level.

13. A dynamic power control module for an optical network comprising:
- a module input which receives an optical transmission containing multiple channels wherein each channel has a characteristic wavelength and power;
- a power control system which receives the optical transmission from the module input, the power control system being driven by control signals to independently regulate the power of each channel;
- a module output which receives the optical transmission from the power control system; and,
- a feedback loop which samples the optical transmission from the module output, wherein the feedback loop measures the power of each individual channel and in response to those measurements generates the control signals that drive the power control system so that the power of each channel at the module output is at a desired level, wherein a power differential between channels at the module output is less than 1 dB.

14. A dynamic power control module for an optical network comprising:
- a module input which receives an optical transmission containing multiple channels wherein each channel has a characteristic wavelength and power;
- a power control system which receives the optical transmission from the module input, the power control system being driven by control signals to independently regulate the power of each channel;
- a module output which receives the optical transmission from the power control system; and,
- a feedback loop which samples the optical transmission from the module output, wherein the feedback loop measures the power of each individual channel and in response to those measurements generates the control signals that drive the power control system so that the power of each channel at the module output is at a desired level, wherein a difference in wavelength between adjacent channels is less than 3 nm.

15. A dynamic power control module for an optical network comprising:
- a module input which receives an optical transmission containing multiple channels wherein each channel has a characteristic wavelength and power;
- a power control system which receives the optical transmission from the module input, the power control system being driven by control signals to independently regulate the power of each channel;
- a module output which receives the optical transmission from the power control system; and,
- a feedback loop which samples the optical transmission from the module output, wherein the feedback loop measures the power of each individual channel and in response to those measurements generates the control signals that drive the power control system so that the power of each channel at the module output is at a desired level, wherein the dynamic power control module has a dynamic response time faster than 0.1 $\mu$s.

16. A method for dynamically equalizing power in an optical transmission having multiple channels comprising:
- (a) receiving the optical transmission having multiple channels, wherein each channel has a different characteristic wavelength and power;
- (b) routing the optical transmission having the multiple channels through a polarization insensitive power equalizer;
- (c) taking at least a portion of an output of step (b) and routing it through a feedback loop;
- (d) dynamically comparing the power of the multiple channels in the feedback loop relative to one another;
- (e) generating RF acoustic control signals in response to the comparison of step (d); and,
- (f) driving the power equalizer with the RF acoustic control signals such that the multiple channels have substantially the same power.

17. A method for dynamically equalizing power in an optical transmission having multiple channels comprising:
- (a) receiving the optical transmission having multiple channels, wherein each channel has a characteristic wavelength and power;

(b) spectrally separating the optical transmission by wavelength into an array of parallel transmissions such that each transmission corresponds to one of the multiple channels, routing the array of parallel transmissions through a parallel array of acousto-optic modulators driven by RF acoustic control signals, and recombining the array of parallel transmissions;

(c) taking at least a portion of an output of step (b) and routing it through a feedback loop;

(d) dynamically comparing the power of the multiple channels in the feedback loop relative to one another;

(e) generating the RF acoustic control signals in response to the comparison of step (d); and, (f) driving the array of acousto-optic modulators with the RF acoustic control signals such that the multiple channels have substantially the same power.

18. A method for dynamically equalizing power in an optical transmission having multiple channels comprising:

(a) receiving the optical transmission having multiple channels, wherein each channel has a characteristic wavelength and power;

(b) routing the optical transmission through a power equalizer;

(c) taking at least a portion of an output of step (b) and routing it through a feedback loop;

(d) separating the portion routed through the feedback loop into multiple feedback transmissions, each feedback transmission including the multiple channels having characteristic wavelengths;

(e) converting each feedback transmission into separate channels by optically filtering out wavelengths from each feedback transmission that do not correspond to the characteristic wavelength of the channel;

(f) generating signals representative of the powers of the channels;

(g) dynamically comparing the signals relative to one another;

(h) generating RF acoustic control signals in response to the comparison of step (g); and, (i) driving the power equalizer with the RF acoustic control signals such that the multiple channels have substantially the same power.

19. A method for dynamically equalizing power in an optical transmission having multiple channels comprising:

(a) receiving the optical transmission having multiple channels, wherein each channel has a characteristic wavelength and power;

(b) routing the optical transmission through a power equalizer including at least one acousto-optic tunable filter driven by RF acoustic control signals such that the acousto-optic tunable filter functions as one of a notch filter in a bar-state or a transmission filter in a cross-state;

(c) taking at least a portion of an output of step (b) and routing it through a feedback loop;

(d) dynamically comparing the power of the multiple channels in the feedback loop relative to one another;

(e) generating the RF acoustic control signals in response to the comparison of step (d); and, (f) driving the power equalizer with the RF acoustic control signals such that the multiple channels have substantially the same power.

20. The dynamic power equalization module of claim 2, wherein the feedback loop includes:

at the module output end, a splitter which separates the potion of the output received from the module output into individual channels;

a plurality of optical filters, each optical filter connected in series with a corresponding channel such that the optical filter filters-out wavelengths that do not correspond to the characteristic wavelength of the channel;

a plurality of photodetectors connect to the optical filters such that each photodetector receives a corresponding channel, the photodetectors producing signals representative of the powers of the different channels; and, a dynamic control circuit connected to the plurality of photodetectors such that the dynamic control circuit receives the signals produced by the photodetectors, compares the signals produced by the photodetectors to determine relative powers of the different channels, and generates the RF acoustic control signals that drive the power equalization device based on the dynamic control circuit's comparison.

* * * * *